US011900230B2

(12) United States Patent
Zhou et al.

(10) Patent No.: US 11,900,230 B2
(45) Date of Patent: Feb. 13, 2024

(54) METHOD, SYSTEM, AND COMPUTER PROGRAM PRODUCT FOR IDENTIFYING SUBPOPULATIONS

(71) Applicant: Visa International Service Association, San Francisco, CA (US)

(72) Inventors: Yuran Zhou, San Mateo, CA (US); Melissa Lawu Tran, Milpitas, CA (US); Lawson Lau, Palo Alto, CA (US)

(73) Assignee: Visa International Service Association, San Francisco, CA (US)

( * ) Notice: Subject to any disclaimer, the term of this patent is extended or adjusted under 35 U.S.C. 154(b) by 1138 days.

(21) Appl. No.: 16/514,156

(22) Filed: Jul. 17, 2019

(65) Prior Publication Data

US 2021/0019664 A1     Jan. 21, 2021

(51) Int. Cl.
*G06N 20/20* (2019.01)
*G06F 16/906* (2019.01)
*G06F 16/35* (2019.01)

(52) U.S. Cl.
CPC ............. *G06N 20/20* (2019.01); *G06F 16/35* (2019.01); *G06F 16/906* (2019.01)

(58) Field of Classification Search
CPC ........ G06N 20/20; G06N 5/003; G06N 7/005; G06F 16/35; G06F 16/906
See application file for complete search history.

(56) References Cited

U.S. PATENT DOCUMENTS

| 10,354,201 | B1* | 7/2019 | Roy ..................... G06N 20/00 |
| 10,916,333 | B1* | 2/2021 | Yeturu .................. G06N 5/003 |
| 2016/0085811 | A1* | 3/2016 | Deolalikar .......... G06F 16/2457 707/738 |
| 2019/0244253 | A1* | 8/2019 | Vij ........................ G06N 20/00 |
| 2019/0259041 | A1* | 8/2019 | Jackson ................ G06N 5/048 |

FOREIGN PATENT DOCUMENTS

| CN | 103559630 A | 2/2014 |
| CN | 104850868 A | 8/2015 |
| CN | 106204267 A | 12/2016 |
| CN | 107451718 A | 12/2017 |
| CN | 107633035 A | 1/2018 |

* cited by examiner

*Primary Examiner* — Irete F Ehichioya
*Assistant Examiner* — Xiaoqin Hu
(74) *Attorney, Agent, or Firm* — The Webb Law Firm

(57) ABSTRACT

A method for identifying subpopulations may include receiving interaction data associated with interactions from a population of individuals. The interaction data may include a plurality of features. A first subpopulation may be identified based on at least one feature of interaction data of each individual. A second subpopulation may include all individuals other than the first subpopulation. The first subpopulation may be clustered into a first plurality of clusters based on the features. A first subset of features may be determined based on the first clusters. The first subpopulation may be clustered into a second plurality of clusters based on the first subset of features. A range for each feature of a second subset of features may be determined based on the second clusters. A subset of the second subpopulation may be determined based on interaction data for each individual and the range for each feature of the second subset of features.

15 Claims, 5 Drawing Sheets

METHOD, SYSTEM, AND COMPUTER PROGRAM PRODUCT FOR IDENTIFYING SUBPOPULATIONS

BACKGROUND

1. Field

This disclosed subject matter relates generally to methods, systems, and products for identifying subpopulations and, in some particular embodiments, to a method, system, and computer program product for identifying subpopulations using clustering and classification.

2. Technical Considerations

In certain circumstances, it may be desirable to identify one or more subpopulations of interest (e.g., target subpopulations and/or the like) from a population of items (e.g., instances, individuals, entities, accounts, and/or the like). For example, a population may be segmented into one or more subpopulations based on one or more features (e.g., fields, parameters, values, strings, properties, characteristics, measurements, and/or the like) of the members thereof.

However, the feature(s) that define a subpopulation may not be known a priori (e.g., in advance and/or the like). For example, when trying to determine whether certain items are authentic or fraudulent, one may not know which feature(s) of such items may be used to confirm whether such items are authentic or fraudulent. Similarly, when trying to identify a target subpopulation for contacting with certain information (e.g., news, political information, healthcare information, marketing information, offers, advertisements, and/or the like), one may not know what features of items (e.g., individuals, entities, accounts, and/or the like) define a suitable (e.g., ideal, preferred, predicted to be effective, and/or the like) subpopulation.

Manual selection (e.g., by a user, developer, and/or the like) of feature(s) to define a subpopulation may require considerable resources (e.g., manual efforts, personnel resources, computing resources, and/or the like), time, and/or the like. Additionally or alternatively, such manual selection may be prone to errors (e.g., human error and/or the like), may not be reproducible, may be inaccurate (e.g., based on assumptions rather than data/evidence), and/or the like.

Clustering data associated with the items of a population may segment (e.g., group and/or the like) the items into clusters based on the features of such items. However, such clustering may produce numerous clusters, which may be too numerous for a user (e.g., developer and/or the like) to evaluate. Additionally or alternatively, the feature(s) associated with each cluster may be numerous (e.g., too numerous for a user to evaluate) and the importance (e.g., accuracy, errors, percentage of variance explained, quality, and/or the like) of each feature in defining the cluster may be difficult to determine.

SUMMARY

Accordingly, it is an object of the presently disclosed subject matter to provide methods, systems, and computer program products for identifying subpopulations, e.g., using clustering and classification.

According to non-limiting embodiments, provided is a method for identifying subpopulations. In some non-limiting embodiments, a method for identifying subpopulations may include receiving interaction data associated with a plurality of interactions from a population of individuals. The interaction data for each individual may include a plurality of features. A first subpopulation of the population may be identified based on at least one feature of respective interaction data of each respective individual in the first subpopulation. A second subpopulation of the population may include all individuals of the population other than the first subpopulation. The first subpopulation may be clustered into a first plurality clusters based on the plurality of features. A first subset of the plurality of features may be determined based on the first plurality of clusters. The first subpopulation may be clustered into a second plurality of clusters based on the first subset of the plurality of features. A range for each feature of a second subset of the plurality of features may be determined based on the second plurality of clusters. A subset of the second subpopulation may be determined based on respective interaction data for each respective individual of the subset of the second subpopulation and the range for each respective feature of the second subset of the plurality of features.

In some non-limiting embodiments, clustering the first subpopulation into the first plurality of clusters may include clustering the first subpopulation into the first plurality of clusters based on the plurality of features using at least one of unsupervised clustering or k-means clustering. Additionally or alternatively, clustering the first subpopulation into the second plurality of clusters may include clustering the first subpopulation into the second plurality of clusters based on the first subset of the plurality of features using at least one of unsupervised clustering or k-means clustering.

In some non-limiting embodiments, determining the first subset of the plurality of features may include determining the first subset of the plurality of features based on the plurality of clusters using at least one of a tree classifier or a random forest tree classifier.

In some non-limiting embodiments, determining the range may include determining a mean and a standard deviation for each feature of the second subset of the plurality of features. Additionally or alternatively, a range for each respective feature of the second subset of the plurality of features may be determined based on a predefined multiple of the standard deviation of the respective feature above and below the mean of the respective feature.

In some non-limiting embodiments, determining the subset of the second subpopulation may include determining the subset of the second subpopulation based on each respective feature of the interaction data for each respective individual of the subset of the second subpopulation being within the range for each respective feature of the second subset of the plurality of features.

In some non-limiting embodiments, receiving interaction data may include receiving payment transaction data associated with a plurality of payment transactions from the population of individuals. Demographic data associated with demographics of each individual of the population of individuals may be received. The payment transaction data and the demographic data for each individual may be combined to form at least part of the interaction data for each individual.

In some non-limiting embodiments, after clustering the first subpopulation into the second plurality of clusters, a number of features of the second subset of the plurality of features may be determined to be within a desired range. In some non-limiting embodiments, the desired range may be less than a predetermined threshold. In some non-limiting embodiments, determining the number of features of the second subset of the plurality of features is within the desired range may include determining a variance explained by each feature of the second subset of the plurality of features exceeds a threshold.

In some non-limiting embodiments, after clustering the first subpopulation into the second plurality of clusters and before determining the range, a number of features of the second subset of the plurality of features may be determined to be outside a desired range. A further subset of the plurality of features may be determined based on the second plurality of clusters. The first subpopulation may be clustered into a further plurality of clusters based on the further subset of the plurality of features. Determining the further subset of the plurality of features and clustering the first subpopulation into the further plurality of clusters may be repeated until a number of features of the further subset of the plurality of features is within a desired range. The second subset of the plurality of features may be replaced with the further subset of the plurality of features and the second plurality of clusters with the further plurality of clusters.

According to non-limiting embodiments, provided is a system for identifying subpopulations. In some non-limiting embodiments, the system for identifying subpopulations may include at least one processor and at least one non-transitory computer readable medium, which may include instructions to direct the at least one processor to receive interaction data associated with a plurality of interactions from a population of individuals. The interaction data for each individual may include a plurality of features. A first subpopulation of the population may be identified based on at least one feature of respective interaction data of each respective individual in the first subpopulation. A second subpopulation of the population may include all individuals of the population other than the first subpopulation. The first subpopulation may be clustered into a first plurality of clusters based on the plurality of features. A first subset of the plurality of features may be determined based on the first plurality of clusters. The first subpopulation may be clustered into a second plurality of clusters based on the first subset of the plurality of features. A range for each feature of a second subset of the plurality of features may be determined based on the second plurality of clusters. A subset of the second subpopulation may be determined based on respective interaction data for each respective individual of the subset of the second subpopulation and the range for each respective feature of the second subset of the plurality of features.

In some non-limiting embodiments, clustering the first subpopulation into the first plurality of clusters may include clustering the first subpopulation into the first plurality of clusters based on the plurality of features using at least one of unsupervised clustering or k-means clustering. Additionally or alternatively, clustering the first subpopulation into the second plurality of clusters may include clustering the first subpopulation into the second plurality of clusters based on the first subset of the plurality of features using at least one of unsupervised clustering or k-means clustering.

In some non-limiting embodiments, determining the first subset of the plurality of features may include determining the first subset of the plurality of features based on the plurality of clusters using at least one of a tree classifier or a random forest tree classifier.

In some non-limiting embodiments, determining the range may include determining a mean and a standard deviation for each feature of the second subset of the plurality of features. Additionally or alternatively, a range for each respective feature of the second subset of the plurality of features may be determined based on a predefined multiple of the standard deviation of the respective feature above and below the mean of the respective feature.

In some non-limiting embodiments, determining the subset of the second subpopulation may include determining the subset of the second subpopulation based on each respective feature of the interaction data for each respective individual of the subset of the second subpopulation being within the range for each respective feature of the second subset of the plurality of features.

In some non-limiting embodiments, receiving interaction data may include receiving payment transaction data associated with a plurality of payment transactions from the population of individuals. Demographic data associated with demographics of each individual of the population of individuals may be received. The payment transaction data and the demographic data for each individual may be combined to form at least part of the interaction data for each individual.

In some non-limiting embodiments, after clustering the first subpopulation into the second plurality of clusters, a number of features of the second subset of the plurality of features may be determined to be within a desired range. In some non-limiting embodiments, the desired range may be less than a predetermined threshold. In some non-limiting embodiments, determining the number of features of the second subset of the plurality of features is within the desired range may include determining a variance explained by each feature of the second subset of the plurality of features exceeds a threshold.

In some non-limiting embodiments, after clustering the first subpopulation into the second plurality of clusters and before determining the range, a number of features of the second subset of the plurality of features may be determined to be outside a desired range. A further subset of the plurality of features may be determined based on the second plurality of clusters. The first subpopulation may be clustered into a further plurality of clusters based on the further subset of the plurality of features. Determining the further subset of the plurality of features and clustering the first subpopulation into the further plurality of clusters may be repeated until a number of features of the further subset of the plurality of features is within a desired range. The second subset of the plurality of features may be replaced with the further subset of the plurality of features and the second plurality of clusters with the further plurality of clusters.

According to non-limiting embodiments, provided is a computer program product for identifying subpopulations. The computer program product may include at least one non-transitory computer-readable medium including one or more instructions that, when executed by at least one processor, cause the at least one processor to receive interaction data associated with a plurality of interactions from a population of individuals. The interaction data for each individual may include a plurality of features. A first subpopulation of the population may be identified based on at least one feature of respective interaction data of each respective individual in the first subpopulation. A second subpopulation of the population may include all individuals of the population other than the first subpopulation. The first subpopulation may be clustered into a first plurality of clusters based on the plurality of features. A first subset of the plurality of features may be determined based on the first plurality of clusters. The first subpopulation may be clustered into a second plurality of clusters based on the first subset of the plurality of features. A range for each feature of a second subset of the plurality of features may be determined based on the second plurality of clusters. A subset of the second subpopulation may be determined based on respective interaction data for each respective individual of the subset of the second subpopulation and the range for each respective feature of the second subset of the plurality of features.

In some non-limiting embodiments, clustering the first subpopulation into the first plurality of clusters may include clustering the first subpopulation into the first plurality of clusters based on the plurality of features using at least one of unsupervised clustering or k-means clustering. Additionally or alternatively, clustering the first subpopulation into the second plurality of clusters may include clustering the first subpopulation into the second plurality of clusters based on the first subset of the plurality of features using at least one of unsupervised clustering or k-means clustering.

In some non-limiting embodiments, determining the first subset of the plurality of features may include determining the first subset of the plurality of features based on the plurality of clusters using at least one of a tree classifier or a random forest tree classifier.

In some non-limiting embodiments, determining the range may include determining a mean and a standard deviation for each feature of the second subset of the plurality of features. Additionally or alternatively, a range for each respective feature of the second subset of the plurality of features may be determined based on a predefined multiple of the standard deviation of the respective feature above and below the mean of the respective feature.

In some non-limiting embodiments, determining the subset of the second subpopulation may include determining the subset of the second subpopulation based on each respective feature of the interaction data for each respective individual of the subset of the second subpopulation being within the range for each respective feature of the second subset of the plurality of features.

In some non-limiting embodiments, receiving interaction data may include receiving payment transaction data associated with a plurality of payment transactions from the population of individuals. Demographic data associated with demographics of each individual of the population of individuals may be received. The payment transaction data and the demographic data for each individual may be combined to form at least part of the interaction data for each individual.

In some non-limiting embodiments, after clustering the first subpopulation into the second plurality clusters, a number of features of the second subset of the plurality of features may be determined to be within a desired range. In some non-limiting embodiments, the desired range may be less than a predetermined threshold. In some non-limiting embodiments, determining the number of features of the second subset of the plurality of features is within the desired range may include determining a variance explained by each feature of the second subset of the plurality of features exceeds a threshold.

In some non-limiting embodiments, after clustering the first subpopulation into the second plurality of clusters and before determining the range, a number of features of the second subset of the plurality of features may be determined to be outside a desired range. A further subset of the plurality of features may be determined based on the second plurality of clusters. The first subpopulation may be clustered into a further plurality of clusters based on the further subset of the plurality of features. Determining the further subset of the plurality of features and clustering the first subpopulation into the further plurality of clusters may be repeated until a number of features of the further subset of the plurality of features is within a desired range. The second subset of the plurality of features may be replaced with the further subset of the plurality of features and the second plurality of clusters with the further plurality of clusters.

Further embodiments are set forth in the following numbered clauses:

Clause 1: A method for identifying subpopulations, comprising: receiving, with at least one processor, interaction data associated with a plurality of interactions from a population of individuals, the interaction data for each individual comprising a plurality of features; identifying, with at least one processor, a first subpopulation of the population based on at least one feature of respective interaction data of each respective individual in the first subpopulation, wherein a second subpopulation of the population comprises all individuals of the population other than the first subpopulation; clustering, with at least one processor, the first subpopulation into a first plurality of clusters based on the plurality of features; determining, with at least one processor, a first subset of the plurality of features based on the first plurality of clusters; clustering, with at least one processor, the first subpopulation into a second plurality of clusters based on the first subset of the plurality of features; determining, with at least one processor, a range for each feature of a second subset of the plurality of features based on the second plurality of clusters; and determining, with at least one processor, a subset of the second subpopulation based on respective interaction data for each respective individual of the subset of the second subpopulation and the range for each respective feature of the second subset of the plurality of features.

Clause 2: The method of clause 1, wherein clustering the first subpopulation into the first plurality of clusters comprises clustering, with at least one processor, the first subpopulation into the first plurality of clusters based on the plurality of features using at least one of unsupervised clustering or k-means clustering, and wherein clustering the first subpopulation into the second plurality of clusters comprises clustering, with at least one processor, the first subpopulation into the second plurality of clusters based on the first subset of the plurality of features using at least one of unsupervised clustering or k-means clustering.

Clause 3: The method of clauses 1 or 2, wherein determining the first subset of the plurality of features comprises determining, with at least one processor, the first subset of the plurality of features based on the first plurality of clusters using at least one of a tree classifier or a random forest tree classifier.

Clause 4: The method of any preceding clause, wherein determining the range comprises: determining, with at least one processor, a mean and a standard deviation for each feature of the second subset of the plurality of features; and determining, with at least one processor, a range for each respective feature of the second subset of the plurality of features based on a predefined multiple of the standard deviation of the respective feature above and below the mean of the respective feature.

Clause 5: The method of any preceding clause, wherein determining the subset of the second subpopulation comprises determining, with at least one processor, the subset of the second subpopulation based on each respective feature of the interaction data for each respective individual of the subset of the second subpopulation being within the range for each respective feature of the second subset of the plurality of features.

Clause 6: The method of any preceding clause, wherein receiving interaction data comprises: receiving, with at least one processor, payment transaction data associated with a plurality of payment transactions from the population of individuals; receiving, with at least one processor, demographic data associated with demographics of each individual of the population of individuals; and combining, with at least one processor, the payment transaction data and the demographic data for each individual to form at least part of the interaction data for each individual.

Clause 7: The method of any preceding clause, further comprising, after clustering the first subpopulation into the second plurality of clusters, determining a number of features of the second subset of the plurality of features is within a desired range.

Clause 8: The method of any preceding clause, wherein the desired range is less than a predetermined threshold.

Clause 9: The method of any preceding clause, wherein determining the number of features of the second subset of the plurality of features is within the desired range comprises: determining, with at least one processor, a variance explained by each feature of the second subset of the plurality of features exceeds a threshold.

Clause 10: The method of any preceding clause, further comprising, after clustering the first subpopulation into the second plurality of clusters and before determining the range: determining, with at least one processor, a number of features of the second subset of the plurality of features is outside a desired range; determining, with at least one processor, a further subset of the plurality of features based on the second plurality of clusters; clustering, with at least one processor, the first subpopulation into a further plurality of clusters based on the further subset of the plurality of features; repeating, with at least one processor, determining the further subset of the plurality of features and clustering the first subpopulation into the further plurality of clusters until a number of features of the further subset of the plurality of features is within a desired range; and replacing, with at least one processor, the second subset of the plurality of features with the further subset of the plurality of features and the second plurality of clusters with the further plurality of clusters.

Clause 11: A system for identifying subpopulations, comprising: at least one processor; and at least one non-transitory computer readable medium comprising instructions to direct the at least one processor to: receive interaction data associated with a plurality of interactions from a population of individuals, the interaction data for each individual comprising a plurality of features; identify a first subpopulation of the population based on at least one feature of respective interaction data of each respective individual in the first subpopulation, wherein a second subpopulation of the population comprises all individuals of the population other than the first subpopulation; cluster the first subpopulation into a first plurality of clusters based on the plurality of features; determine a first subset of the plurality of features based on the first plurality of clusters; cluster the first subpopulation into a second plurality of clusters based on the first subset of the plurality of features; determine a range for each feature of a second subset of the plurality of features based on the second plurality of clusters; and determine a subset of the second subpopulation based on respective interaction data for each respective individual of the subset of the second subpopulation and the range for each respective feature of the second subset of the plurality of features.

Clause 12: The system of clause 11, wherein clustering the first subpopulation into the first plurality of clusters comprises clustering the first subpopulation into the first plurality of clusters based on the plurality of features using at least one of unsupervised clustering or k-means clustering, and wherein clustering the first subpopulation into the second plurality of clusters comprises clustering the first subpopulation into the second plurality of clusters based on the first subset of the plurality of features using at least one of unsupervised clustering or k-means clustering.

Clause 13: The system of clauses 11 or 12, wherein determining the first subset of the plurality of features comprises determining the first subset of the plurality of features based on the first plurality of clusters using at least one of a tree classifier or a random forest tree classifier.

Clause 14: The system of any one of clauses 11-13, wherein determining the range comprises determining a mean and a standard deviation for each feature of the second subset of the plurality of features, and determining a range for each respective feature of the second subset of the plurality of features based on a predefined multiple of the standard deviation of the respective feature above and below the mean of the respective feature.

Clause 15: The system of any one of clauses 11-14, wherein determining the subset of the second subpopulation comprises determining the subset of the second subpopulation based on each respective feature of the interaction data for each respective individual of the subset of the second subpopulation being within the range for each respective feature of the second subset of the plurality of features.

Clause 16: The system of any one of clauses 11-15, wherein receiving interaction data comprises receiving payment transaction data associated with a plurality of payment transactions from the population of individuals, receiving demographic data associated with demographics of each individual of the population of individuals, and combining the payment transaction data and the demographic data for each individual to form at least part of the interaction data for each individual.

Clause 17: The system of any one of clauses 11-16, wherein the instructions further direct the at least one processor to, after clustering the first subpopulation into the second plurality of clusters, determine a number of features of the second subset of the plurality of features is within a desired range.

Clause 18: The system of any one of clauses 11-17, wherein the desired range is less than a predetermined threshold.

Clause 19: The system of any one of clauses 11-18, wherein determining the number of features of the second subset of the plurality of features is within the desired range comprises determining a variance explained by each feature of the second subset of the plurality of features exceeds a threshold.

Clause 20: The system of any one of clauses 11-19, wherein the instructions further direct the at least one processor to, after clustering the first subpopulation into the second plurality of clusters and before determining the range: determine a number of features of the second subset of the plurality of features is outside a desired range; determine a further subset of the plurality of features based on the second plurality of clusters; cluster the first subpopulation into a further plurality of clusters based on the further subset of the plurality of features; repeat determining the further subset of the plurality of features and clustering the first subpopulation into the further plurality of clusters until a number of features of the further subset of the plurality of features is within a desired range; and replace the second subset of the plurality of features with the further subset of the plurality of features and the second plurality of clusters with the further plurality of clusters.

Clause 21: A computer program product for identifying subpopulations, the computer program product comprising at least one non-transitory computer-readable medium including one or more instructions that, when executed by at least one processor, cause the at least one processor to: receive interaction data associated with a plurality of interactions from a population of individuals, the interaction data for each individual comprising a plurality of features; identify a first subpopulation of the population based on at least one feature of respective interaction data of each respective individual in the first subpopulation, wherein a second subpopulation of the population comprises all individuals of the population other than the first subpopulation; cluster the first subpopulation into a first plurality of clusters based on the plurality of features; determine a first subset of the plurality of features based on the first plurality of clusters; cluster the first subpopulation into a second plurality of clusters based on the first subset of the plurality of features; determine a range for each feature of a second subset of the plurality of features based on the second plurality of clusters; and determine a subset of the second subpopulation based on respective interaction data for each respective individual of the subset of the second subpopulation and the range for each respective feature of the second subset of the plurality of features.

Clause 22: The computer program product of clause 21, wherein clustering the first subpopulation into the first plurality of clusters comprises clustering the first subpopulation into the first plurality of clusters based on the plurality of features using at least one of unsupervised clustering or k-means clustering, and wherein clustering the first subpopulation into the second plurality of clusters comprises clustering the first subpopulation into the second plurality of clusters based on the first subset of the plurality of features using at least one of unsupervised clustering or k-means clustering.

Clause 23: The computer program product of clauses 21 or 22, wherein determining the first subset of the plurality of features comprises determining the first subset of the plurality of features based on the first plurality of clusters using at least one of a tree classifier or a random forest tree classifier.

Clause 24: The computer program product of any one of clauses 21-23, wherein determining the range comprises determining a mean and a standard deviation for each feature of the second subset of the plurality of features, and determining a range for each respective feature of the second subset of the plurality of features based on a predefined multiple of the standard deviation of the respective feature above and below the mean of the respective feature.

Clause 25: The computer program product of any one of clauses 21-24, wherein determining the subset of the second subpopulation comprises determining the subset of the second subpopulation based on each respective feature of the interaction data for each respective individual of the subset of the second subpopulation being within the range for each respective feature of the second subset of the plurality of features.

Clause 26: The computer program product of any one of clauses 21-25, wherein receiving interaction data comprises receiving payment transaction data associated with a plurality of payment transactions from the population of individuals, receiving demographic data associated with demographics of each individual of the population of individuals, and combining the payment transaction data and the demographic data for each individual to form at least part of the interaction data for each individual.

Clause 27: The computer program product of any one of clauses 21-26, wherein the instructions further direct the at least one processor to, after clustering the first subpopulation into the second plurality of clusters, determine a number of features of the second subset of the plurality of features is within a desired range.

Clause 28: The computer program product of any one of clauses 21-27, wherein the desired range is less than a predetermined threshold.

Clause 29: The computer program product of any one of clauses 21-28, wherein determining the number of features of the second subset of the plurality of features is within the desired range comprises determining a variance explained by each feature of the second subset of the plurality of features exceeds a threshold.

Clause 30: The computer program product of any one of clauses 21-29, wherein the instructions further direct the at least one processor to, after clustering the first subpopulation into the second plurality of clusters and before determining the range: determine a number of features of the second subset of the plurality of features is outside a desired range; determine a further subset of the plurality of features based on the second plurality of clusters; cluster the first subpopulation into a further plurality of clusters based on the further subset of the plurality of features; repeat determining the further subset of the plurality of features and clustering the first subpopulation into the further plurality of clusters until a number of features of the further subset of the plurality of features is within a desired range; and replace the second subset of the plurality of features with the further subset of the plurality of features and the second plurality of clusters with the further plurality of clusters.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments that are illustrated in the accompanying figures, in which.

DESCRIPTION

Figure 1:
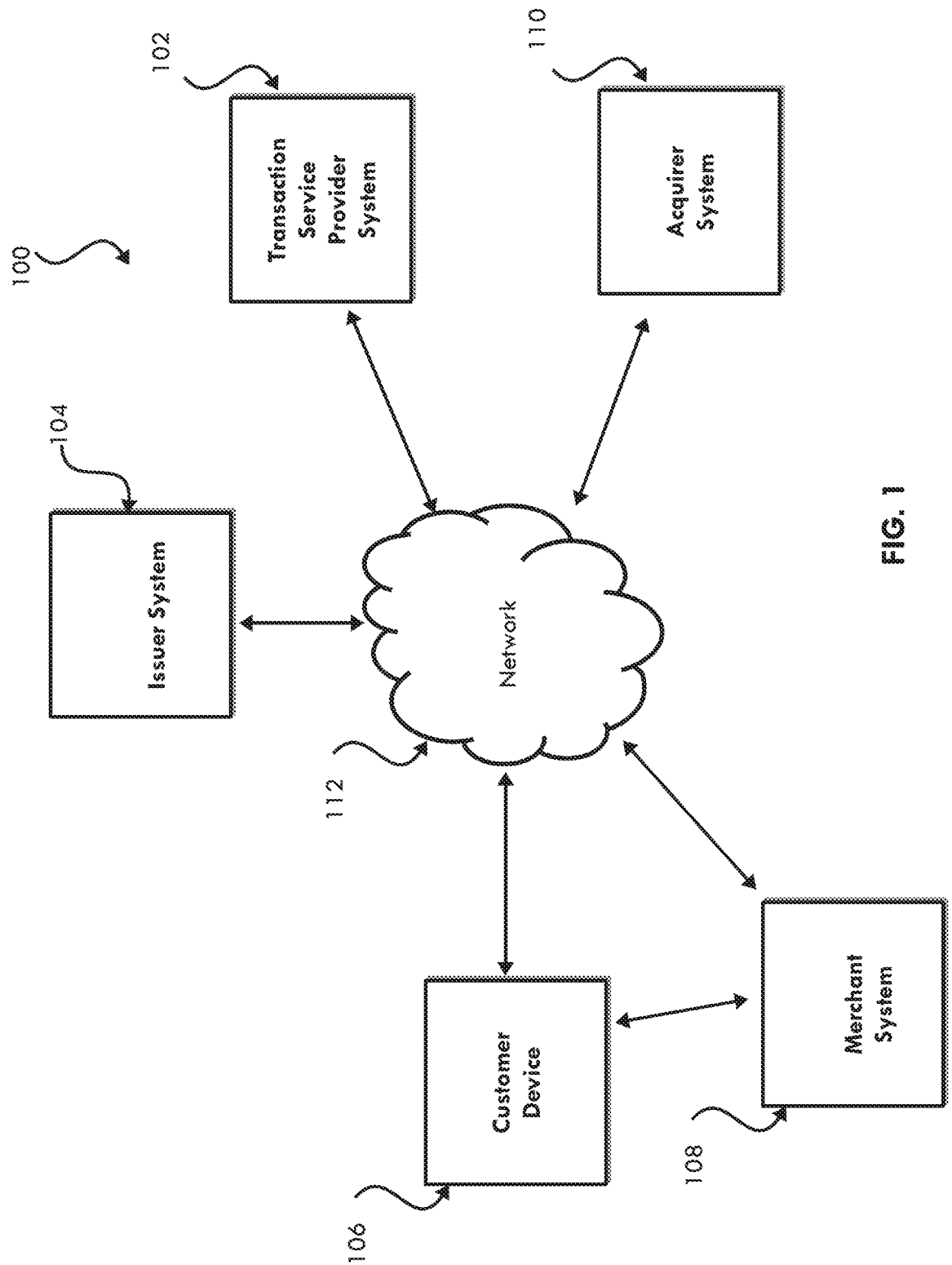
FIG. 1 is a diagram of a non-limiting embodiment of an environment in which methods, systems, and/or computer program products, described herein, may be implemented according to the principles of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet and/or the like) that includes data. It will be appreciated that numerous other arrangements are possible.

As used herein, the terms "issuer institution," "portable financial device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a portable financial device, such as a physical financial instrument, e.g., a payment card, and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "account identifier" may include one or more types of identifiers associated with a user account (e.g., a PAN, a card number, a payment card number, a token, and/or the like). In some non-limiting embodiments, an issuer institution may provide an account identifier (e.g., a PAN, a token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments, the account identifier may be an original account identifier, where the original account identifier was provided to a user at the creation of the account associated with the account identifier. In some non-limiting embodiments, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the terms "payment token" or "token" may refer to an identifier that is used as a substitute or replacement identifier for an account identifier, such as a PAN. Tokens may be associated with a PAN or other account identifiers in one or more data structures (e.g., one or more databases and/or the like) such that they can be used to conduct a transaction (e.g., a payment transaction) without directly using the account identifier, such as a PAN. In some examples, an account identifier, such as a PAN, may be associated with a plurality of tokens for different individuals, different uses, and/or different purposes. For example, a payment token may include a series of numeric and/or alphanumeric characters that may be used as a substitute for an original account identifier. For example, a payment token "4900 0000 0000 0001" may be used in place of a PAN "4147 0900 0000 1234." In some non-limiting embodiments, a payment token may be "format preserving" and may have a numeric format that conforms to the account identifiers used in existing payment processing networks (e.g., ISO 8583 financial transaction message format). In some non-limiting embodiments, a payment token may be used in place of a PAN to initiate, authorize, settle, or resolve a payment transaction or represent the original credential in other systems where the original credential would typically be provided. In some non-limiting embodiments, a token value may be generated such that the recovery of the original PAN or other account identifier from the token value may not be computationally derived (e.g., with a one-way hash or other cryptographic function). Further, in some non-limiting embodiments, the token format may be configured to allow the entity receiving the payment token to identify it as a payment token and recognize the entity that issued the token.

As used herein, the term "provisioning" may refer to a process of enabling a device to use a resource or service. For example, provisioning may involve enabling a device to perform transactions using an account. Additionally or alternatively, provisioning may include adding provisioning data associated with account data (e.g., a payment token representing an account number) to a device.

As used herein, the term "token requestor" may refer to an entity that is seeking to implement tokenization according to embodiments of the presently disclosed subject matter. For example, the token requestor may initiate a request that a PAN be tokenized by submitting a token request message to a token service provider. Additionally or alternatively, a token requestor may no longer need to store a PAN associated with a token once the requestor has received the payment token in response to a token request message. In some non-limiting embodiments, the requestor may be an application, a device, a process, or a system that is configured to perform actions associated with tokens. For example, a requestor may request registration with a network token system, request token generation, token activation, token de-activation, token exchange, other token lifecycle management related processes, and/or any other token related processes. In some non-limiting embodiments, a requestor may interface with a network token system through any suitable communication network and/or protocol (e.g., using HTTPS, SOAP, and/or an XML interface among others). For example, a token requestor may include card-on-file merchants, acquirers, acquirer processors, payment gateways acting on behalf of merchants, payment enablers (e.g., original equipment manufacturers, mobile network operators, and/or the like), digital wallet providers, issuers, third-party wallet providers, payment processing networks, and/or the like. In some non-limiting embodiments, a token requestor may request tokens for multiple domains and/or channels. Additionally or alternatively, a token requestor may be registered and identified uniquely by the token service provider within the tokenization ecosystem. For example, during token requestor registration, the token service provider may formally process a token requestor's application to participate in the token service system. In some non-limiting embodiments, the token service provider may collect information pertaining to the nature of the requestor and relevant use of tokens to validate and formally approve the token requestor and establish appropriate domain restriction controls. Additionally or alternatively, successfully registered token requestors may be assigned a token requestor identifier that may also be entered and maintained within the token vault. In some non-limiting embodiments, token requestor identifiers may be revoked and/or token requestors may be assigned new token requestor identifiers. In some non-limiting embodiments, this information may be subject to reporting and audit by the token service provider.

As used herein, the term a "token service provider" may refer to an entity including one or more server computers in a token service system that generates, processes, and maintains payment tokens. For example, the token service provider may include or be in communication with a token vault where the generated tokens are stored. Additionally or alternatively, the token vault may maintain one-to-one mapping between a token and a PAN represented by the token. In some non-limiting embodiments, the token service provider may have the ability to set aside licensed BINs as token BINs to issue tokens for the PANs that may be submitted to the token service provider. In some non-limiting embodiments, various entities of a tokenization ecosystem may assume the roles of the token service provider. For example, payment networks and issuers or their agents may become the token service provider by implementing the token services according to non-limiting embodiments of the presently disclosed subject matter. Additionally or alternatively, a token service provider may provide reports or data output to reporting tools regarding approved, pending, or declined token requests, including any assigned token requestor ID. The token service provider may provide data output related to token-based transactions to reporting tools and applications and present the token and/or PAN as appropriate in the reporting output. In some non-limiting embodiments, the EMVCo standards organization may publish specifications defining how tokenized systems may operate. For example, such specifications may be informative, but they are not intended to be limiting upon any of the presently disclosed subject matter.

As used herein, the term "token vault" may refer to a repository that maintains established token-to-PAN mappings. For example, the token vault may also maintain other attributes of the token requestor that may be determined at the time of registration and/or that may be used by the token service provider to apply domain restrictions or other controls during transaction processing. In some non-limiting embodiments, the token vault may be a part of a token service system. For example, the token vault may be provided as a part of the token service provider. Additionally or alternatively, the token vault may be a remote repository accessible by the token service provider. In some non-limiting embodiments, token vaults, due to the sensitive nature of the data mappings that are stored and managed therein, may be protected by strong underlying physical and logical security. Additionally or alternatively, a token vault may be operated by any suitable entity, including a payment network, an issuer, clearing houses, other financial institutions, transaction service providers, and/or the like.

As used herein, the term "merchant" may refer to one or more entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein, "merchant system" may refer to one or more computer systems operated by or on behalf of a merchant, such as a server computer executing one or more software applications. As used herein, the term "product" may refer to one or more goods and/or services offered by a merchant.

As used herein, a "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, a "point-of-sale (POS) system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments, a transaction service provider may include a credit card company, a debit card company, and/or the like. As used herein, the term "transaction service provider system" may also refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the term "acquirer" may refer to an entity licensed by the transaction service provider and approved by the transaction service provider to originate transactions (e.g., payment transactions) using a portable financial device associated with the transaction service provider. As used herein, the term "acquirer system" may also refer to one or more computer systems, computer devices, and/or the like operated by or on behalf of an acquirer. The transactions the acquirer may include payment transactions (e.g., purchases, original credit transactions (OCTs), account funding transactions (AFTs), and/or the like). In some non-limiting embodiments, the acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure that proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitators, and/or the like. In some non-limiting embodiments, an acquirer may be a financial institution, such as a bank.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Wallet™, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments, the portable financial device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway and/or to a payment gateway itself. The term "payment gateway mobile application" may refer to one or more electronic devices and/or one or more software applications configured to provide payment services for transactions (e.g., payment transactions, electronic payment transactions, and/or the like).

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

Non-limiting embodiments of the disclosed subject matter are directed to systems, methods, and computer program products for identifying subpopulations, including, but not limited to, identifying subpopulations using clustering and classification. For example, non-limiting embodiments of the disclosed subject matter provide identifying a first subpopulation based on at least one feature (e.g., field, parameter, value, string, property, characteristic, measurement, and/or the like) of respective data of each respective item (e.g., instances, individuals, entities, accounts, and/or the like) in the first subpopulation, clustering the first subpopulation, determining a first subset of features based on the clusters (e.g., using tree classification such as random forest tree classification and/or the like), repeating the clustering based on the first subset of features to result in a second plurality of clusters, determining a range for each feature of a second subset of features based on the second plurality of clusters, and determining (e.g., identifying and/or the like) a subset of a second subpopulation based the range for each feature of the second subset of features. Such embodiments provide techniques and systems that reduce (e.g., eliminate, decrease, and/or the like) manual efforts, reduce time, identify target subpopulations (e.g., the subset of the second subpopulation and/or the like) in a manner that is reproducible, scalable, and accurate (e.g., accuracy may be determined, calculated, predicted, and/or the like based on the data). Additionally or alternatively, such embodiments provide techniques and systems that may iteratively cluster and determine (e.g., classify) subsets of features, which may reduce the number of clusters, reduce the number of feature(s) associated with the clusters (e.g., each cluster, the set of clusters, and/or the like), may provide (e.g., determine, calculate, predict, and/or the like) an indication of efficacy (e.g., accuracy, percentage of variance explained, quality, and/or the like), and/or the like. Additionally or alternatively, such embodiments provide techniques and systems that are flexible, e.g., may be applied to any population of items of any type. Additionally or alternatively, such embodiments provide techniques and systems that are interpretable, e.g., determine (e.g., identify and/or the like) which (reduced) subset of features sufficiently defines the target subpopulation, provide an indication of efficacy of such features in defining the target subpopulation, and/or the like.

For the purpose of illustration, in the following description, while the presently disclosed subject matter is described with respect to methods, systems, and computer program products for identifying subpopulations, e.g., based on interaction data, one skilled in the art will recognize that the disclosed subject matter is not limited to the illustrative embodiments. For example, the methods, systems, and computer program products described herein may be used with a wide variety of settings, such as identifying subpopulations in any suitable setting, e.g., fraud prevention, contacting target subpopulations with certain information (e.g., news, political information, healthcare information, marketing information, offers, advertisements, and/or the like), lending risk, financial predictions, medical diagnostics, and/or the like.

Referring now to FIG. 1, FIG. 1 is a diagram of a non-limiting embodiment of an environment 100 in which systems, products, and/or methods, as described herein, may be implemented. As shown in FIG. 1, environment 100 includes transaction service provider system 102, issuer system 104, customer device 106, merchant system 108, acquirer system 110, and network 112.

Transaction service provider system 102 may include one or more devices capable of receiving information from and/or communicating information to issuer system 104, customer device 106, merchant system 108, and/or acquirer system 110 via network 112. For example, transaction service provider system 102 may include a computing device, such as a server (e.g., a transaction processing server), a group of servers, and/or other like devices. In some non-limiting embodiments, transaction service provider system 102 may be associated with a transaction service provider as described herein. In some non-limiting embodiments, transaction service provider system 102 may be in communication with a data storage device, which may be local or remote to transaction service provider system 102. In some non-limiting embodiments, transaction service provider system 102 may be capable of receiving information from, storing information in, communicating information to, or searching information stored in the data storage device.

Issuer system 104 may include one or more devices capable of receiving information and/or communicating information to transaction service provider system 102, customer device 106, merchant system 108, and/or acquirer system 110 via network 112. For example, issuer system 104 may include a computing device, such as a server, a group of servers, and/or other like devices. In some non-limiting embodiments, issuer system 104 may be associated with an issuer institution as described herein. For example, issuer system 104 may be associated with an issuer institution that issued a credit account, debit account, credit card, debit card, and/or the like to a user associated with customer device 106.

Customer device 106 may include one or more devices capable of receiving information from and/or communicating information to transaction service provider system 102, issuer system 104, merchant system 108, and/or acquirer system 110 via network 112. Additionally or alternatively, each customer device 106 may include a device capable of receiving information from and/or communicating information to other customer devices 106 via network 112, another network (e.g., an ad hoc network, a local network, a private network, a virtual private network, and/or the like), and/or any other suitable communication technique. For example, customer device 106 may include a client device and/or the like. In some non-limiting embodiments, customer device 106 may or may not be capable of receiving information (e.g., from merchant system 108 or from another customer device 106) via a short-range wireless communication connection (e.g., an NFC communication connection, an RFID communication connection, a Bluetooth® communication connection, a Zigbee® communication connection, and/or the like), and/or communicating information (e.g., to merchant system 108) via a short-range wireless communication connection.

Merchant system 108 may include one or more devices capable of receiving information from and/or communicating information to transaction service provider system 102, issuer system 104, customer device 106, and/or acquirer system 110 via network 112. Merchant system 108 may also include a device capable of receiving information from customer device 106 via network 112, a communication connection (e.g., an NFC communication connection, an RFID communication connection, a Bluetooth® communication connection, a Zigbee® communication connection, and/or the like) with customer device 106, and/or the like, and/or communicating information to customer device 106 via the network, the communication connection, and/or the like. In some non-limiting embodiments, merchant system 108 may include a computing device, such as a server, a group of servers, a client device, a group of client devices, and/or other like devices. In some non-limiting embodiments, merchant system 108 may be associated with a merchant as described herein. In some non-limiting embodiments, merchant system 108 may include one or more client devices. For example, merchant system 108 may include a client device that allows a merchant to communicate information to transaction service provider system 102. In some non-limiting embodiments, merchant system 108 may include one or more devices, such as computers, computer systems, and/or peripheral devices capable of being used by a merchant to conduct a transaction with a user. For example, merchant system 108 may include a POS device and/or a POS system.

Acquirer system 110 may include one or more devices capable of receiving information from and/or communicating information to transaction service provider system 102, issuer system 104, customer device 106, and/or merchant system 108 via network 112. For example, acquirer system 110 may include a computing device, a server, a group of servers, and/or the like. In some non-limiting embodiments, acquirer system 110 may be associated with an acquirer as described herein.

Network 112 may include one or more wired and/or wireless networks. For example, network 112 may include a cellular network (e.g., a long-term evolution (LTE) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of environment 100 may perform one or more functions described as being performed by another set of systems or another set of devices of environment 100.

Figure 2:
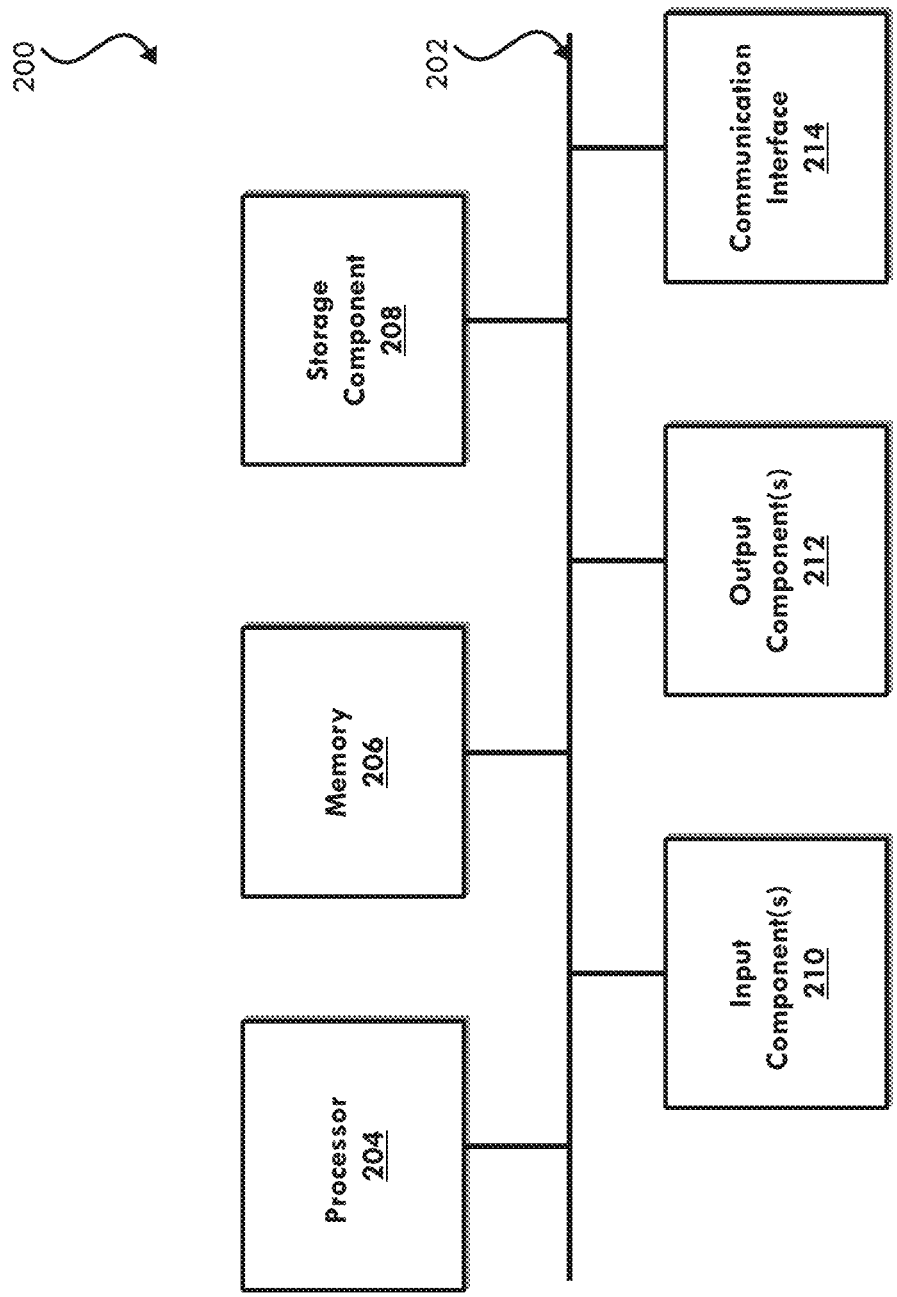
FIG. 2 is a diagram of a non-limiting embodiment of components of one or more devices of FIG. 1.

Referring now to FIG. 2, FIG. 2 is a diagram of example components of a device 200. Device 200 may correspond to one or more devices of transaction service provider system 102, one or more devices of issuer system 104, customer device 106, one or more devices of merchant system 108, and/or one or more devices of acquirer system 110. In some non-limiting embodiments, transaction service provider system 102, issuer system 104, customer device 106, merchant system 108, and/or acquirer system 110 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, firmware, or a combination of hardware and software. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 206 may include random access memory (RAM), read-only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, a camera, and/or the like). Additionally or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
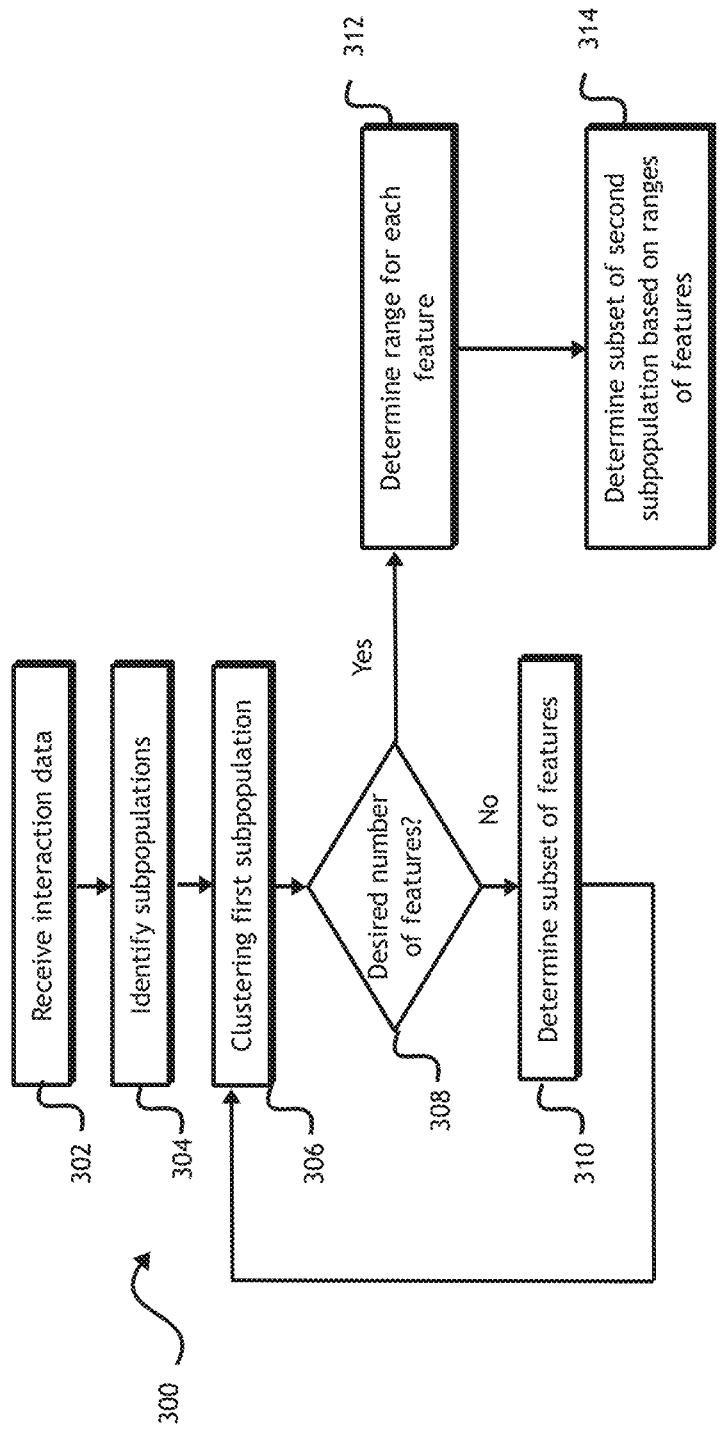
FIG. 3 is a flowchart of a non-limiting embodiment of a process for identifying subpopulations according to the principles of the presently disclosed subject matter.

Referring now to FIG. 3, FIG. 3 is a flowchart of a non-limiting embodiment of a process 300 for identifying subpopulations. In some non-limiting embodiments, one or more of the steps of process 300 may be performed (e.g., completely, partially, and/or the like) by transaction service provider system 102 (e.g., one or more devices of transaction service provider system 102). In some non-limiting embodiments, one or more of the steps of process 300 may be performed (e.g., completely, partially, and/or the like) by another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), acquirer system 110 (e.g., one or more devices of acquirer system 110), and/or the like. In some non-limiting embodiments, a central system may be implemented (e.g., completely, partially, and/or the like) by transaction service provider system 102. In some non-limiting embodiments, a central system may be implemented (e.g., completely, partially, and/or the like) by another system, another device, another group of systems, or another group of devices, separate from or including transaction service provider system 102, such as issuer system 104, customer device 106, merchant system 108, acquirer system 110, and/or the like.

As shown in FIG. 3, at step 302, process 300 may include receiving interaction data. For example, a central system (e.g., transaction service provider system 102 and/or the like) may receive (e.g., from issuer system 104, customer device 106, merchant system 108, acquirer system 110, and/or the like) interaction data. In some non-limiting embodiments, interaction data may be associated with a plurality of interactions from a population of items (e.g., instances, individuals, entities, accounts, and/or the like). Additionally or alternatively, the interaction data for each item may include a plurality of features (e.g., fields, parameters, values, strings, properties, characteristics, measurements, and/or the like).

In some non-limiting embodiments, interaction data may include transaction data (e.g., payment transaction data) associated with a plurality of transactions (e.g., payment transactions) from the population of items (e.g., instances, individuals, entities, accounts, and/or the like). In some non-limiting embodiments, the central system (e.g., transaction service provider system 102 and/or the like) may calculate spendographic information based on the transaction data. For example, spendographic information may include spending by merchant category, merchant category code (MCC), and/or the like (e.g. spending in each category such as grocery, gas, restaurants, and/or the like), which may be provided in the interaction data (e.g., transaction data) and/or provided by acquirer system 110, merchant system 108, transaction service provider system 102, and/or the like. In some non-limiting embodiments, spendographic information may be calculated based on the sum and/or total spending in each category (e.g., merchant category and/or the like), the sum and/or total spending in a set of merchant categories (e.g., a set of MCCs grouped together into a broader category and/or the like), and/or the like, and such spendographic information may be calculated based on (e.g., within, during, and/or the like) a time period (e.g., predetermined time period, selected time period, dynamically and/or automatically selected time period, and/or the like), based on a population, a subpopulation, and/or the like, based on each item (e.g., individual, account, and/or the like), and/or the like. Additionally or alternatively, interaction data may include communication data associated with a plurality of communications (e.g., public and/or private messages, emails, text messages, telephone calls, voice over internet protocol (VoIP) calls, social media posts, web browsing, and/or the like). In some non-limiting embodiments, each communication may be associated with at least one item (e.g., communication by at least one entity, between at least two entities, and/or the like). In some non-limiting embodiments, interaction data may include demographic data associated with demographics of each item (e.g., individual, entity, and/or the like) of the population of items.

In some non-limiting embodiments, the central system (e.g., transaction service provider system 102 and/or the like) may receive at least a first portion of the interaction data (e.g., transaction data, payment transaction data, communication data, and/or the like) from a first source (e.g., issuer system 104, customer device 106, merchant system 108, acquirer system 110, and/or the like). Additionally or alternatively, the central system (e.g., transaction service provider system 102 and/or the like) may receive at least a second portion of the interaction data (e.g., demographic data and/or the like) from a second source (e.g., issuer system 104, customer device 106, merchant system 108, acquirer system 110, a third party system (not pictured), and/or the like). In some non-limiting embodiments, the first source may be separate from the second source. In some non-limiting embodiments, the central system (e.g., transaction service provider system 102 and/or the like) may combine the at least the first portion of the interaction data (e.g., transaction data, payment transaction data, communication data, and/or the like) and the at least the second portion of the interaction data (e.g., demographic data and/or the like) for each item (e.g., individual, entity, and/or the like) to form at least part of the interaction data for each item.

As shown in FIG. 3, at step 304, process 300 may include identifying subpopulations. For example, the central system (e.g., transaction service provider system 102 and/or the like) may identify a first subpopulation of the population based on at least one feature of respective interaction data of each respective item (e.g., individual, entity, and/or the like) in the first subpopulation. Additionally or alternatively, a second subpopulation of the population may include all items (e.g., individuals, entities, and/or the like) of the population other than the first subpopulation (e.g., that do not share the at least one feature with the first subpopulation).

As shown in FIG. 3, at step 306, process 300 may include clustering the first subpopulation. For example, the central system (e.g., transaction service provider system 102 and/or the like) may cluster the first subpopulation into a plurality of clusters based on the plurality of features of respective interaction data of each respective item (e.g., individual, entity, and/or the like) in the first subpopulation.

In some non-limiting embodiments, the central system (e.g., transaction service provider system 102 and/or the like) may cluster the first subpopulation into a first plurality of clusters based on the plurality of features using at least one of unsupervised clustering, k-means clustering, any combination thereof, and/or the like. For example, k-means clustering may be useful for segmentation of unlabeled data (e.g., interaction data), interpretability of data (e.g., interaction data), handling both numerical and categorical data (e.g., interaction data), and providing granular information on subpopulations and/or subsets thereof.

Figure 4A:
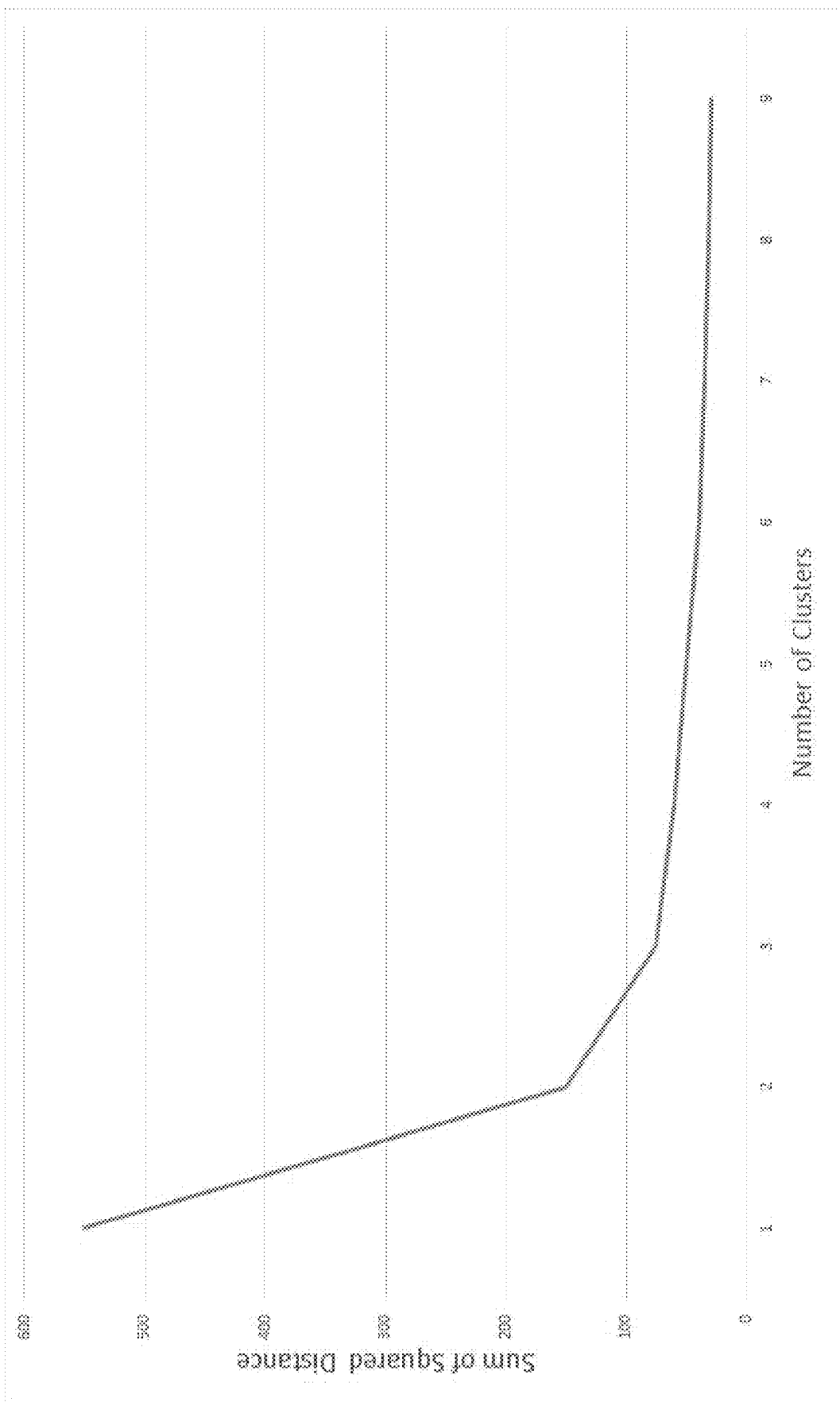
FIGS. 4A-4B are charts of non-limiting embodiments of metrics for evaluation of a non-limiting embodiment of the process shown in FIG. 3 according to the principles of the presently disclosed subject matter.

Referring now to FIG. 4A, FIG. 4A is an exemplary chart of sum of squared distance/errors based on number of clusters (k) of a non-limiting embodiment relating to process 300 shown in FIG. 3. As shown in FIG. 4A, the sum of squared distance may be shown on the vertical axis and number of clusters (k) may be shown on the horizontal axis. In some non-limiting embodiments, the sum of squared distance may be determined (e.g., calculated and/or the like) based on the sum of distance between data points (e.g., each data point representing one item) and the centroid of the associated clusters in which each data point is assigned. For example, the sum of squared distance may be associated with (e.g., indicate and/or the like) the accuracy of the clustering. In some non-limiting embodiments, decreasing the sum of squared distance may be associated with improved accuracy. In some non-limiting embodiments, a number of clusters for clustering at each iteration of step 306 may be determined (e.g., selected and/or the like) based on balancing reducing the sum of squared distance and reducing the number of clusters. For example, if the smallest number of clusters for which the sum of squared distance is below a threshold, the smallest number of clusters for which the marginal reduction in sum of squared distance compared to an adjacent number of clusters and/or the like may be chosen.

Figure 4B:
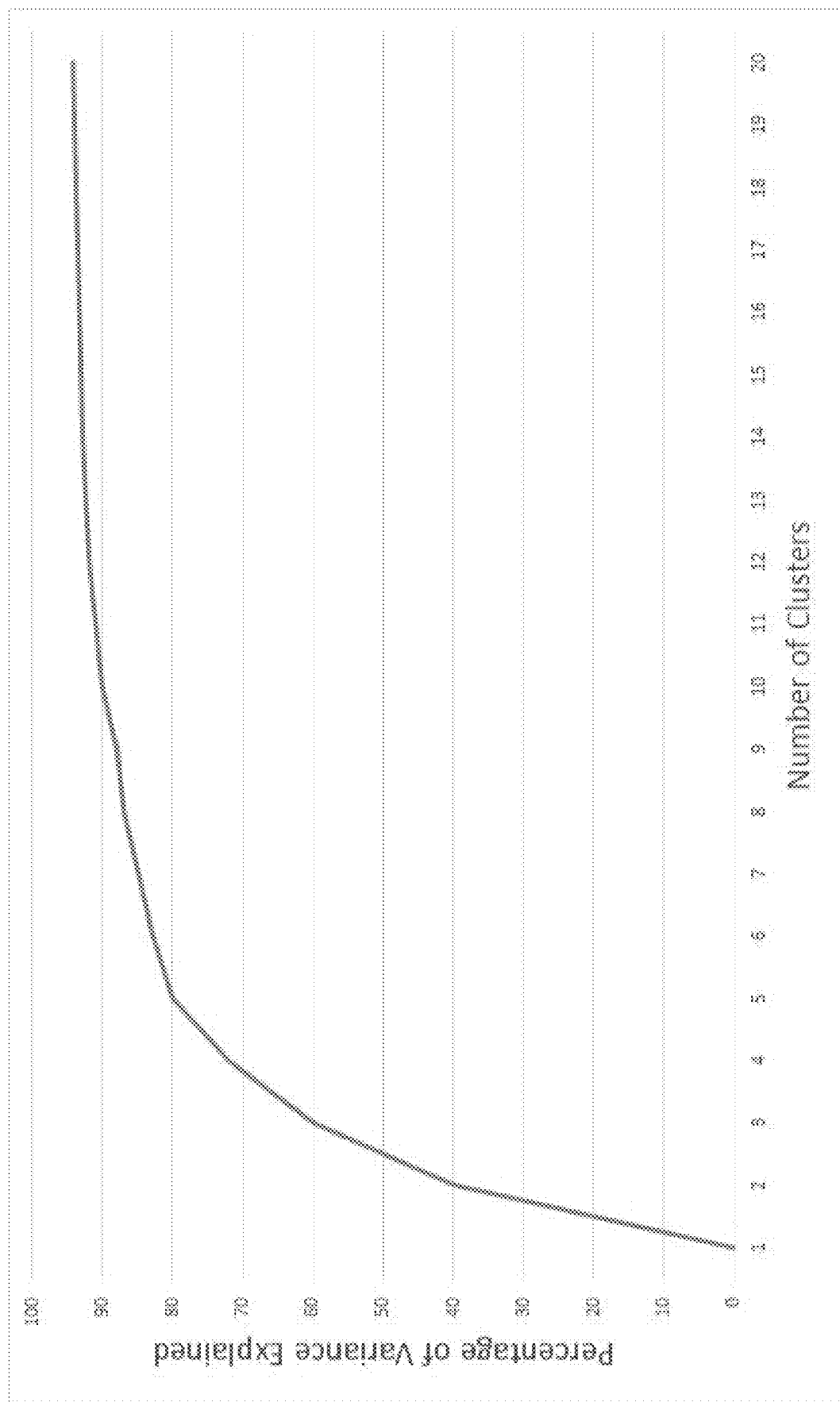

Referring now to FIG. 4B, FIG. 4B is an exemplary chart of percentage of variance explained based on number of clusters (k) of a non-limiting embodiment relating to process 300 shown in FIG. 3. As shown in FIG. 4B, percentage of variance explained may be shown on the vertical axis and number of clusters (k) may be shown on the horizontal axis. In some non-limiting embodiments, percentage of variance explained may be determined (e.g., calculated and/or the like) based on the sum of the variance explained by the feature(s) associated with each cluster of the number of clusters. For example, the percentage of variance explained by each feature may be determined using a classifier (e.g., random forest classifier and/or the like), as described below. In some non-limiting embodiments, increasing the percentage of variance explained may be associated with improved performance. In some non-limiting embodiments, a number of clusters for clustering at each iteration of step 306 may be determined (e.g., selected and/or the like) based on balancing increasing the percentage of variance explained and reducing the number of clusters. For example, if the smallest number of clusters for which the percentage of variance explained exceeds a threshold, the smallest number of clusters for which the marginal increase in the percentage of variance explained compared to an adjacent number of clusters and/or the like may be chosen. In some non-limiting embodiments, the threshold for percentage of variance explained may be a predetermined threshold (e.g., 70%, 80%, 90%, 95%, and/or the like).

Referring again to FIG. 3, at step 308, process 300 may include determining whether the clustering resulted in a desired number of features. For example, the central system (e.g., transaction service provider system 102 and/or the like) may determine whether a number of features is within a desired range.

In some non-limiting embodiments, each cluster of the first plurality of clusters may be associated with at least one feature of the plurality of features, and the central system (e.g., transaction service provider system 102 and/or the like) may determine the number of features based thereon (e.g., the number of clusters, the number of features associated with the first plurality of clusters, and/or the like). In some non-limiting embodiments, the central system (e.g., transaction service provider system 102 and/or the like) may determine the number of features is within a desired range (e.g., a predetermined range, less than a predetermined threshold for the number of features, a variance explained by the features exceeds a threshold, an accuracy of the features exceeds a threshold, and/or the like). Additionally or alternatively, process 300 may include multiple iterations of at least some of steps 306 through 308, and the central system (e.g., transaction service provider system 102 and/or the like) may determine by default to proceed to step 310 after the first iteration of step 308 (e.g., by default, proceed as if the number of features is not within the desired range).

As shown in FIG. 3, at step 310, process 300 may include determining a subset of the features. For example, the central system (e.g., transaction service provider system 102 and/or the like) may determine a first subset of the plurality of features based on the first plurality of clusters.

In some non-limiting embodiments, the central system (e.g., transaction service provider system 102 and/or the like) may determine the first subset of the plurality of features based on the plurality of clusters (e.g., based on using at least one output segment of clustering (306) as a label for supervised machine learning and/or the like) using at least one of a tree classifier, a random forest tree classifier, any combination thereof, and/or the like. For example, using a random forest tree classifier, the central system (e.g., transaction service provider system 102 and/or the like) may rank the plurality of features based on the variance explained by each feature (e.g., using each feature as a label for the random forest tree classifier, using the feature(s) identified in the output segment(s) of clustering as label(s) for the random forest tree classifier, and/or the like). Additionally or alternatively, the central system (e.g., transaction service provider system 102 and/or the like) may select the first subset from the plurality of features based on the ranking (e.g., a predetermined number of features, a predetermined percentage of features, a subset of features for which the variance explained thereby exceeds a threshold, and/or the like). In some non-limiting embodiments, the central system (e.g., transaction service provider system 102 and/or the like) may select the top-ranked features for which the sum of the variance explained thereby exceeds a predetermined threshold (e.g., 70%, 80%, 90%, 95%, and/or the like).

In some non-limiting embodiments, a random forest classifier may include a supervised machine learning model that may be used to calculate accuracy, precision, recall, and percentage of variance explained. For example, accuracy may include ratio of correctly predicted classifications to the total items. Additionally or alternatively, precision may include the ratio of correctly predicted positive classifications to the total predicted positive classifications. Additionally or alternatively, recall may include the ratio of correctly predicted positive classifications to all items that actually should be positively classified. In some non-limiting embodiments, the random forest classifier may be used to determine the percentage of variance explained by each feature. For example, using a random forest tree classifier, the central system (e.g., transaction service provider system 102 and/or the like) may rank the plurality of features based on the variance explained by each feature. Additionally or alternatively, the central system (e.g., transaction service provider system 102 and/or the like) may select the first subset from the plurality of features based on the ranking (e.g., a predetermined number of features at the top of the ranking, a predetermined percentage of features at the top of the ranking, a subset of features at the top of the ranking for which the variance explained thereby exceeds a threshold, and/or the like). In some non-limiting embodiments, the central system (e.g., transaction service provider system 102 and/or the like) may select the top-ranked features for which the sum of the variance explained thereby exceeds a predetermined threshold (e.g., 70%, 80%, 90%, 95%, and/or the like).

As shown in FIG. 3, process 300 may return to step 306. For example, the central system (e.g., transaction service provider system 102 and/or the like) may cluster the first subpopulation into a second plurality of clusters based on the first subset of the plurality of features. In some non-limiting embodiments, the central system (e.g., transaction service provider system 102 and/or the like) may cluster the first subpopulation into the second plurality of clusters based on the first subset of the plurality of features using at least one of unsupervised clustering, k-means clustering, any combination thereof, and/or the like.

As shown in FIG. 3, process 300 may return to step 308. For example, the central system (e.g., transaction service provider system 102 and/or the like) may determine whether the second (or subsequent) clustering resulted in a desired number of features. For example, the central system (e.g., transaction service provider system 102 and/or the like) may determine whether a number of features is within a desired range.

In some non-limiting embodiments, each cluster of the second (or subsequent) plurality of clusters may be associated with at least one feature of the plurality of features, and the central system (e.g., transaction service provider system 102 and/or the like) may determine the number of features based thereon (e.g., the number of clusters, the number of features associated with the second (or subsequent) plurality of clusters, and/or the like). In some non-limiting embodiments, the central system (e.g., transaction service provider system 102 and/or the like) may determine that the number of features is within a desired range (e.g., a predetermined range, less than a predetermined threshold for the number of features, a variance explained by the features exceeds a threshold, an accuracy of the features exceeds a threshold, and/or the like). Additionally or alternatively, process 300 may include multiple iterations of at least some of steps 306 through 308, and the central system (e.g., transaction service provider system 102 and/or the like) may determine whether the (second or subsequent) clustering resulted in a desired number of features for each second and subsequent iteration.

In some non-limiting embodiments, the desired range for the number of features may be less than or equal to a predetermined threshold. For example, a predetermined threshold may be ten features (e.g., ten clusters, each associated with one feature, ten total features associated with the second (or subsequent) plurality of clusters, and/or the like). If the central system (e.g., transaction service provider system 102 and/or the like) determines that the number of features after the second (or subsequent) clustering is less than or equal to the threshold (e.g., ten features), process 300 may proceed to step 312. Otherwise, process 300 may proceed to step 310, and at least one more iteration of steps 310, 306, and 308 may be performed.

In some non-limiting embodiments, determining that the number of features of the second subset of the plurality of features is within the desired range may include the central system (e.g., transaction service provider system 102 and/or the like) determining a variance explained by each feature of the second (or subsequent) subset of the plurality of features exceeds a threshold, a sum of the variance explained by the second (or subsequent) subset of the plurality of features exceeds a predetermined threshold (e.g., 70%, 80%, 90%, 95%, and/or the like), an accuracy of the features of the second (or subsequent) subset of the plurality of features exceeds a threshold, any combination thereof, and/or the like. If the central system (e.g., transaction service provider system 102 and/or the like) determines that the number of features after the second (or subsequent) clustering is within the desired range, process 300 may proceed to step 312. Otherwise, process 300 may proceed to step 310, and at least one more iteration of steps 310, 306, and 308 may be performed.

In some non-limiting embodiments, after clustering the first subpopulation into the second (or subsequent) plurality of clusters, the central system (e.g., transaction service provider system 102 and/or the like) may determine that a number of features of the second (or subsequent) subset of the plurality of features is outside a desired range. Additionally or alternatively, the central system (e.g., transaction service provider system 102 and/or the like) may repeat step 310, e.g., determine a further subset of the plurality of features based on the second (or subsequent) plurality of clusters. Additionally or alternatively, the central system (e.g., transaction service provider system 102 and/or the like) may repeat step 306, e.g., cluster the first subpopulation into a further plurality of clusters based on the further subset of the plurality of features. Additionally or alternatively, the central system (e.g., transaction service provider system 102 and/or the like) may continue to iteratively repeat steps 308, 310, and 306, e.g., repeating determining the further subset of the plurality of features and clustering the first subpopulation into the further plurality of clusters until a number of features of the further subset of the plurality of features is within a desired range. Additionally or alternatively, the central system (e.g., transaction service provider system 102 and/or the like) may proceed to step 312 based on the further subset of the plurality of features and the further plurality of clusters.

As shown in FIG. 3, at step 312, process 300 may include determining a range for each feature of a second (or subsequent) subset of the plurality of features. For example, the central system (e.g., transaction service provider system 102 and/or the like) may determine a range for each feature of the second (or subsequent) subset of the plurality of features based on the second plurality of clusters.

In some non-limiting embodiments, determining the range may include the central system (e.g., transaction service provider system 102 and/or the like) determining a mean and a standard deviation for each feature of the second (or subsequent) subset of the plurality of features. Additionally or alternatively, the central system (e.g., transaction service provider system 102 and/or the like) may determine a range for each respective feature of the second (or subsequent) subset of the plurality of features based on a predefined multiple (e.g., one (1) time, one-and-a-half (1.5) times, two (2) times, three (3) times, and/or the like) of the standard deviation of the respective feature above and below the mean of the respective feature.

As shown in FIG. 3, at step 314, process 300 may include determining a subset of the second subpopulation. For example, the central system (e.g., transaction service provider system 102 and/or the like) may determine a subset of the second subpopulation based on respective interaction data for each respective item (e.g., individual, entity, and/or the like) of the subset of the second subpopulation and the range for each respective feature of the second subset of the plurality of features.

In some non-limiting embodiments, determining the subset of the second subpopulation may include the central system (e.g., transaction service provider system 102 and/or the like) determining the subset of the second subpopulation based on each respective feature of the interaction data for each respective item (e.g., individual, entity, and/or the like) of the subset of the second subpopulation being within the range for each respective feature of the second (or subsequent) subset of the plurality of features. For example, every item (e.g., individual, entity, and/or the like) of the second subpopulation for which the features thereof are all within the range for each feature of the second (or subsequent) subset of the plurality of features may be determined (e.g., by the central system) to be in the subset of the second subpopulation.

In some non-limiting embodiments, the first subpopulation may be a subpopulation of individuals. For example, the first subpopulation may include existing customers of an entity (e.g., merchant, issuer, and/or the like). Additionally or alternatively, the second subpopulation may be a subpopulation of individuals. For example, the second subpopulation may include individuals who are not yet customers of the entity (e.g., merchant, issuer, and/or the like). Additionally or alternatively, the subset of the second population determined as described herein may include "look-alikes," e.g., individuals in the second subpopulation that share features (e.g., the second (or subsequent) subset of features) with the first subpopulation. Accordingly, the subset of the second subpopulation may be a target subpopulation for the entity (e.g., merchant, issuer, and/or the like). For example, the entity (e.g., merchant, issuer, and/or the like) may direct communications, meetings, advertising, marketing campaigns, sales pitches, and/or the like at the target subpopulation.

TABLE 1

Percentage of Population for Segments

| Segment | Cobrand Card Customers | Non-Cobrand Card Customers |
|---|---|---|
| Exclusive Shoppers (Medium Income) | 18% | 11% |
| Exclusive Shoppers (Affluent) | 17% | 10% |
| Educated Male (Affluent) | 9% | 16% |
| Online Enthusiast (Affluent) | 9% | 3% |
| Multi Brand Shoppers (Medium Income) | 6% | 8% |
| Educated Shoppers (Upper Affluent) | 6% | 8% |
| Others | 34% | 43% |
| Total | 100% | 100% |

For the purpose of illustration, Table 1 shows the percentage of a population in various segments (e.g., groups associated with at least one feature) for a first subpopulation (e.g., customers of a hypothetical merchant with cobranded credit cards) and a second subpopulation (e.g., customers of the hypothetical merchant without cobranded credit cards) determined as described herein. As shown in Table 1, the top six segments derived based on five features (gender, education, household income, merchant brand online spend, and merchant brand spend) may make up 66% of cobrand credit card customers and 57% of non-cobrand credit card customers. Accordingly, the hypothetical merchant may target the subset of the second population with features within the determined range with offers for cobranded credit cards, as described herein.

Although the disclosed subject matter has been described in detail for the purpose of illustration based on what is currently considered to be the most practical and preferred embodiments, it is to be understood that such detail is solely for that purpose and that the disclosed subject matter is not limited to the disclosed embodiments, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

What is claimed is:

1. A method for identifying subpopulations, comprising:
receiving, with at least one processor, interaction data associated with a plurality of interactions from a population of individuals, the interaction data for each individual comprising a plurality of features, the plurality of features comprising a plurality of fields each associated with at least one of payment transaction data associated with a plurality of payment transactions, spendographic data determined based on the payment transaction data, or demographic data associated with a respective individual of the population of individuals;
identifying, with at least one processor, a first subpopulation of the population based on at least one feature of respective interaction data of each respective individual in the first subpopulation, wherein a second subpopulation of the population comprises all individuals of the population other than the first subpopulation;
after identifying the first subpopulation, clustering, with at least one processor, the first subpopulation into a first plurality of clusters based on the plurality of features;
determining, with at least one processor, a first subset of the plurality of features based on the first plurality of clusters, wherein determining the first subset of the plurality of features comprises determining the first subset of the plurality of features based on the first plurality of clusters using at least one of a tree classifier or a random forest tree classifier;

clustering, with at least one processor, the first subpopulation into a second plurality of clusters based on the first subset of the plurality of features;

after clustering the first subpopulation into the second plurality of clusters, determining, with at least one processor, a number of features of a second subset of the plurality of features is outside a desired range, wherein determining number of features of the second subset of the plurality of features is outside the desired range comprises determining a variance explained by each feature of the second subset of the plurality of features does not exceed a threshold;

determining, with at least one processor, a further subset of the plurality of features based on the second plurality of clusters;

clustering, with at least one processor, the first subpopulation into a further plurality of clusters based on the further subset of the plurality of features;

repeating, with at least one processor, determining the further subset of the plurality of features and clustering the first subpopulation into the further plurality of clusters until a number of features of the further subset of the plurality of features is within the desired range, wherein determining the number of features of the further subset of the plurality of features is within the desired range comprises determining a variance explained by each feature of the further subset of the plurality of features exceeds the threshold;

replacing, with at least one processor, the second subset of the plurality of features with the further subset of the plurality of features and the second plurality of clusters with the further plurality of clusters;

after determining the number of features of the further subset of the plurality of features is within the desired range and replacing the second subset of the plurality of features with the further subset of the plurality of features and the second plurality of clusters with the further plurality of clusters, determining, with at least one processor, a range for each feature of a second subset of the plurality of features based on the second plurality of clusters;

after determining the range for each feature of the second subset of the plurality of features based on the second plurality of clusters of the first subpopulation, determining, with at least one processor, a subset of the second subpopulation based on respective interaction data for each respective individual of the subset of the second subpopulation and the range for each respective feature of the second subset of the plurality of features, the subset of the second subpopulation comprising a target subpopulation; and after determining the target subpopulation, communicating, with at least one processor, at least one communication based on the target subpopulation.

2. The method of claim 1, wherein clustering the first subpopulation into the first plurality of clusters comprises clustering, with at least one processor, the first subpopulation into the first plurality of clusters based on the plurality of features using at least one of unsupervised clustering or k-means clustering, and wherein clustering the first subpopulation into the second plurality of clusters comprises clustering, with at least one processor, the first subpopulation into the second plurality of clusters based on the first subset of the plurality of features using at least one of unsupervised clustering or k-means clustering.

3. The method of claim 1, wherein determining the range comprises:

determining, with at least one processor, a mean and a standard deviation for each feature of the second subset of the plurality of features; and determining, with at least one processor, a range for each respective feature of the second subset of the plurality of features based on a predefined multiple of the standard deviation of the respective feature above and below the mean of the respective feature.

4. The method of claim 1, wherein determining the subset of the second subpopulation comprises determining, with at least one processor, the subset of the second subpopulation based on each respective feature of the interaction data for each respective individual of the subset of the second subpopulation being within the range for each respective feature of the second subset of the plurality of features.

5. The method of claim 1, wherein the demographic data is associated with demographics of each individual of the population of individuals, and wherein receiving interaction data comprises: receiving, with at least one processor, the payment transaction data associated with the plurality of payment transactions from the population of individuals;

receiving, with at least one processor, the demographic data associated with the demographics of each individual of the population of individuals; and combining, with at least one processor, the payment transaction data and the demographic data for each individual to form at least part of the interaction data for each individual.

6. A system for identifying subpopulations, comprising:
at least one processor; and
at least one non-transitory computer readable medium comprising instructions to direct the at least one processor to:

receive interaction data associated with a plurality of interactions from a population of individuals, the interaction data for each individual comprising a plurality of features, the plurality of features comprising a plurality of fields each associated with at least one of payment transaction data associated with a plurality of payment transactions, spendographic data determined based on the payment transaction data, or demographic data associated with a respective individual of the population of individuals;

identify a first subpopulation of the population based on at least one feature of respective interaction data of each respective individual in the first subpopulation, wherein a second subpopulation of the population comprises all individuals of the population other than the first subpopulation;

after identifying the first subpopulation, cluster the first subpopulation into a first plurality of clusters based on the plurality of features;

determine a first subset of the plurality of features based on the first plurality of clusters, wherein determining the first subset of the plurality of features comprises determining the first subset of the plurality of features based on the first plurality of clusters using at least one of a tree classifier or a random forest tree classifier;

cluster the first subpopulation into a second plurality of clusters based on the first subset of the plurality of features;

after clustering the first subpopulation into the second plurality of clusters, determine a number of features of a second subset of the plurality of features is outside a desired range, wherein determining the number of features of the second subset of the plurality of features is outside the desired range comprises determining a variance explained by each feature of the second subset of the plurality of features does not exceed a threshold;

determine a further subset of the plurality of features based on the second plurality of clusters;

cluster the first subpopulation into a further plurality of clusters based on the further subset of the plurality of features;

repeat determining the further subset of the plurality of features and clustering the first subpopulation into the further plurality of clusters until a number of features of the further subset of the plurality of features is within the desired range, wherein determining the number of features of the further subset of the plurality of features is within the desired range comprises determining a variance explained by each feature of the further subset of the plurality of features exceeds the threshold;

replace the second subset of the plurality of features with the further subset of the plurality of features and the second plurality of clusters with the further plurality of clusters;

after determining the number of features of the further subset of the plurality of features is within the desired range and replacing the second subset of the plurality of features with the further subset of the plurality of features and the second plurality of clusters with the further plurality of clusters, determine a range for each feature of a second subset of the plurality of features based on the second plurality of clusters;

after determining the range for each feature of the second subset of the plurality of features based on the second plurality of clusters of the first subpopulation, determine a subset of the second subpopulation based on respective interaction data for each respective individual of the subset of the second subpopulation and the range for each respective feature of the second subset of the plurality of features, the subset of the second subpopulation comprising a target subpopulation; and after determining the target subpopulation, communicate at least one communication based on the target subpopulation.

7. The system of claim 6, wherein clustering the first subpopulation into the first plurality of clusters comprises clustering the first subpopulation into the first plurality of clusters based on the plurality of features using at least one of unsupervised clustering or k-means clustering, and wherein clustering the first subpopulation into the second plurality of clusters comprises clustering the first subpopulation into the second plurality of clusters based on the first subset of the plurality of features using at least one of unsupervised clustering or k-means clustering.

8. The system of claim 6, wherein determining the range comprises determining a mean and a standard deviation for each feature of the second subset of the plurality of features, and determining a range for each respective feature of the second subset of the plurality of features based on a predefined multiple of the standard deviation of the respective feature above and below the mean of the respective feature.

9. The system of claim 6, wherein determining the subset of the second subpopulation comprises determining the subset of the second subpopulation based on each respective feature of the interaction data for each respective individual of the subset of the second subpopulation being within the range for each respective feature of the second subset of the plurality of features.

10. The system of claim 6, wherein the demographic data is associated with demographics of each individual of the population of individuals, and wherein receiving interaction data comprises receiving the payment transaction data associated with the plurality of payment transactions from the population of individuals, receiving the demographic data associated with the demographics of each individual of the population of individuals, and combining the payment transaction data and the demographic data for each individual to form at least part of the interaction data for each individual.

11. A computer program product for identifying subpopulations, the computer program product comprising at least one non-transitory computer-readable medium including one or more instructions that, when executed by at least one processor, cause the at least one processor to:

receive interaction data associated with a plurality of interactions from a population of individuals, the interaction data for each individual comprising a plurality of features, the plurality of features comprising a plurality of fields each associated with at least one of payment transaction data associated with a plurality of payment transactions, spendographic data determined based on the payment transaction data, or demographic data associated with a respective individual of the population of individuals;

identify a first subpopulation of the population based on at least one feature of respective interaction data of each respective individual in the first subpopulation, wherein a second subpopulation of the population comprises all individuals of the population other than the first subpopulation;

after identifying the first subpopulation, cluster the first subpopulation into a first plurality of clusters based on the plurality of features;

determine a first subset of the plurality of features based on the first plurality of clusters, wherein determining the first subset of the plurality of features comprises determining the first subset of the plurality of features based on the first plurality of clusters using at least one of a tree classifier or a random forest tree classifier;

cluster the first subpopulation into a second plurality of clusters based on the first subset of the plurality of features;

after clustering the first subpopulation into the second plurality of clusters, determine a number of features of a second subset of the plurality of features is outside a desired range, wherein determining the number of features of the second subset of the plurality of features is outside the desired range comprises determining a variance explained by each feature of the second subset of the plurality of features does not exceed a threshold;

determine a further subset of the plurality of features based on the second plurality of clusters;

cluster the first subpopulation into a further plurality of clusters based on the further subset of the plurality of features;

repeat determining the further subset of the plurality of features and clustering the first subpopulation into the further plurality of clusters until a number of features of the further subset of the plurality of features is within the desired range, wherein determining the number of features of the further subset of the plurality of features is within the desired range comprises determining a variance explained by each feature of the further subset of the plurality of features exceeds the threshold;

replace the second subset of the plurality of features with the further subset of the plurality of features and the second plurality of clusters with the further plurality of clusters;

after determining the number of features of the further subset of the plurality of features is within the desired range and replacing the second subset of the plurality of features with the further subset of the plurality of features and the second plurality of clusters with the further plurality of clusters, determine a range for each feature of a second subset of the plurality of features based on the second plurality of clusters;

after determining the range for each feature of the second subset of the plurality of features based on the second plurality of clusters of the first subpopulation, determine a subset of the second subpopulation based on respective interaction data for each respective individual of the subset of the second subpopulation and the range for each respective feature of the second subset of the plurality of features, the subset of the second subpopulation comprising a target subpopulation; and after determining the target subpopulation, communicate at least one communication based on the target subpopulation.

12. The computer program product of claim 11, wherein clustering the first subpopulation into the first plurality of clusters comprises clustering the first subpopulation into the first plurality of clusters based on the plurality of features using at least one of unsupervised clustering or k-means clustering, and wherein clustering the first subpopulation into the second plurality of clusters comprises clustering the first subpopulation into the second plurality of clusters based on the first subset of the plurality of features using at least one of unsupervised clustering or k-means clustering.

13. The computer program product of claim 11, wherein determining the range comprises determining a mean and a standard deviation for each feature of the second subset of the plurality of features, and determining a range for each respective feature of the second subset of the plurality of features based on a predefined multiple of the standard deviation of the respective feature above and below the mean of the respective feature.

14. The computer program product of claim 11, wherein determining the subset of the second subpopulation comprises determining the subset of the second subpopulation based on each respective feature of the interaction data for each respective individual of the subset of the second subpopulation being within the range for each respective feature of the second subset of the plurality of features.

15. The computer program product of claim 11, wherein the demographic data is associated with demographics of each individual of the population of individuals, and wherein receiving the interaction data comprises receiving the payment transaction data associated with the plurality of payment transactions from the population of individuals, receiving the demographic data associated with the demographics of each individual of the population of individuals, and combining the payment transaction data and the demographic data for each individual to form at least part of the interaction data for each individual.

* * * * *